United States Patent
Brillant et al.

(10) Patent No.: US 9,152,285 B2
(45) Date of Patent: Oct. 6, 2015

(54) POSITION DETECTION OF AN OBJECT WITHIN PROXIMITY OF A TOUCH SENSOR

(71) Applicants: Gregory Brillant, Trondheim (NO); Steinar Myren, Vikhammer (NO); Trond Jarle Pedersen, Trondheim (NO); Terje Saether, Sor-Trondelag (NO)

(72) Inventors: Gregory Brillant, Trondheim (NO); Steinar Myren, Vikhammer (NO); Trond Jarle Pedersen, Trondheim (NO); Terje Saether, Sor-Trondelag (NO)

(73) Assignee: Atmel Corporation, San Jose, CA (US)

( * ) Notice: Subject to any disclaimer, the term of this patent is extended or adjusted under 35 U.S.C. 154(b) by 189 days.

(21) Appl. No.: 13/954,232

(22) Filed: Jul. 30, 2013

(65) Prior Publication Data
US 2015/0035783 A1    Feb. 5, 2015

(51) Int. Cl.
*G06F 3/044*    (2006.01)

(52) U.S. Cl.
CPC ...... *G06F 3/044* (2013.01); *G06F 2203/04108* (2013.01)

(58) Field of Classification Search
CPC .................. G06F 2203/04108; G06F 3/044
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2002/0154039 A1* | 10/2002 | Lambert et al. | 341/33 |
| 2009/0237372 A1* | 9/2009 | Kim et al. | 345/173 |
| 2009/0315854 A1 | 12/2009 | Matsuo | |
| 2010/0295559 A1* | 11/2010 | Osoinach | 324/658 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Ariel Balaoing
(74) *Attorney, Agent, or Firm* — Baker Botts L.L.P.

(57) ABSTRACT

In one embodiment, a method includes applying a drive signal to a first electrode of a sensor to generate an electric field extending at least in part from the first electrode toward a second electrode of the sensor. The electric field includes a first portion and a second portion, and the first portion extends farther away from a plane of the first electrode than the second portion. The method also includes shunting the second portion of the electric field away from the second electrode and receiving a sense signal from the second electrode produced at least in part by the first portion of the electric field. The sense signal indicates whether an object has come within proximity of the sensor.

20 Claims, 5 Drawing Sheets

POSITION DETECTION OF AN OBJECT WITHIN PROXIMITY OF A TOUCH SENSOR

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
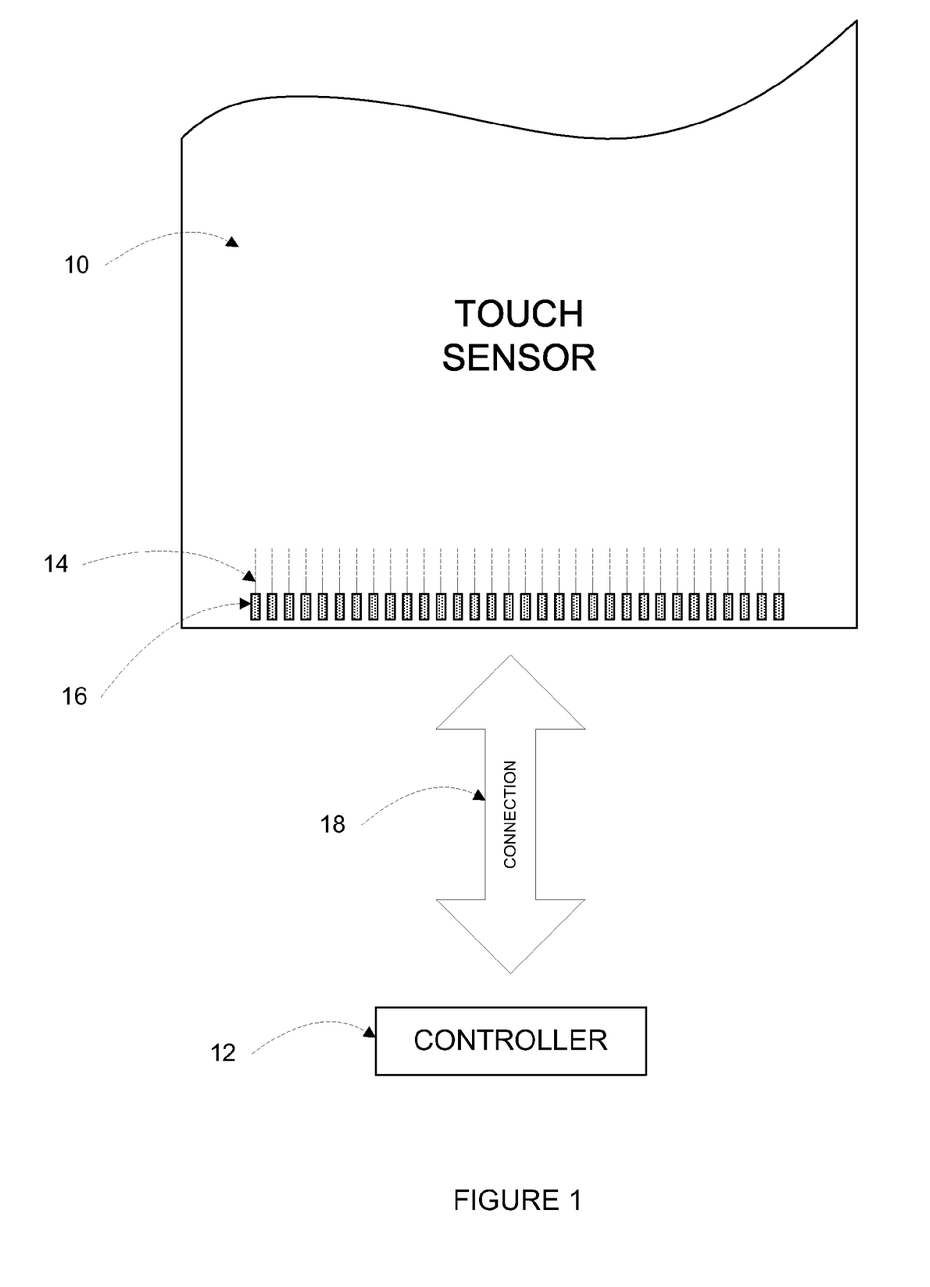
FIG. 1 illustrates an example sensor with an example sensor controller.

FIG. 1 illustrates an example sensor 10 with an example sensor controller 12. In the example of FIG. 1, sensor 10 is a touch sensor and sensor controller 12 is a touch-sensor controller. Sensor 10 and sensor controller 12 may detect the presence and location of a touch or the proximity of an object within a touch-sensitive area of sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Sensor 10 may include one or more touch-sensitive areas, where appropriate. Sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including sensor 10 and sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of sensor 10 may be made of polyethylene terephthalate (PET) or another suitable material. This disclosure contemplates any suitable substrate with any suitable portions made of any suitable material. In particular embodiments, the drive or sense electrodes in sensor 10 may be made of ITO in whole or in part. In particular embodiments, the drive or sense electrodes in sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Sensor 10 may implement a capacitive form of touch sensing. In a mutual-capacitance implementation, sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and sensor controller 12 may measure the change in capacitance. By measuring changes in capacitance throughout the array, sensor controller 12 may determine the position of the touch or proximity within the touch-sensitive area(s) of sensor 10.

In particular embodiments, sensor 10 may determine the position of an object (such as a stylus or a user's finger or hand) that makes physical contact with a touch-sensitive area of sensor 10. In addition or as an alternative, in particular embodiments, sensor 10 may determine the position of an object that comes within proximity of sensor 10 without necessarily contacting sensor 10. In particular embodiments, an object may come within proximity of sensor 10 when it is located some distance above a surface of sensor 10; when it hovers in a particular position above a surface of sensor 10; when it makes a motion (such as for example a swiping motion or an air gesture) above a surface of sensor 10; or any suitable combination of the above. In particular embodiments, determining the position of an object that comes within proximity of sensor 10 without making physical contact may be referred to as determining the proximity of an object. In particular embodiments, determining the proximity of an object may comprise determining the position of an object's projection onto sensor 10 when the object is located some distance above a plane of sensor 10. The projection of an object onto sensor 10 may be made along an axis that is substantially orthogonal to a plane of sensor 10. In particular embodiments, the position of an object's projection onto sensor 10 may be referred to as the position or the location of an object. As an example and not by way of limitation, sensor 10 may determine the position of an object when the object is located above the surface of sensor 10 and within a distance of approximately 20 mm of the surface of sensor 10. Although this disclosure describes or illustrates particular sensors 10 that may determine a position of physical contact of an object, a proximity of an object, or a combination of the two, this disclosure contemplates any suitable sensor 10 suitably configured to determine a position of physical contact of an object, a proximity of an object, or any suitable combination of one or more of the above.

In a self-capacitance implementation, sensor 10 may include an array of electrodes of a single type that may each form a capacitive node. When an object touches or comes within proximity of the capacitive node, a change in self-capacitance may occur at the capacitive node and sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, sensor controller 12 may determine the position of the touch or proximity within the touch-sensitive area(s) of sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. Additionally, one or more ground electrodes may together form a ground line running horizontally or vertically or in any suitable orientation. In particular embodiments, drive lines may run substantially perpendicular to sense lines. In particular embodiments, drive lines may run substantially parallel to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate. Additionally, reference to a ground line may encompass one or more ground electrodes making up the ground line, and vice versa, where appropriate. In particular embodiments, any electrode may be configured as a drive, sense, or ground electrode and the configuration of any electrode may be changed during operation of sensor 10. In particular embodiments, configuration of electrodes may be controlled by sensor controller 12.

Sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, sensor 10 may have drive electrodes disposed in a pattern on one side of a substrate and sense electrodes disposed in a pattern on another side of the substrate. Moreover, sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes or illustrates particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of sensor 10 may indicate a touch or proximity input at the position of the capacitive node. Sensor controller 12 may detect and process the change in capacitance to determine the presence and location of the touch or proximity input. Sensor controller 12 may then communicate information about the touch or proximity input to one or more other components (such as one or more central processing units (CPUs)) of a device that includes sensor 10 and sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Sensor controller 12 may be one or more integrated circuits (ICs), such as for example general-purpose microprocessors, microcontrollers, programmable logic devices or arrays, application-specific ICs (ASICs). In particular embodiments, sensor controller 12 comprises analog circuitry, digital logic, and digital non-volatile memory. In particular embodiments, sensor controller 12 is disposed on a flexible printed circuit (FPC) bonded to the substrate of sensor 10, as described below. The FPC may be active or passive, where appropriate. In particular embodiments, multiple touch-sensor controllers 12 are disposed on the FPC. Sensor controller 12 may include a processor unit, a drive unit, a sense unit, and a storage unit. The drive unit may supply drive signals to the drive electrodes of sensor 10. The sense unit may sense charge at the capacitive nodes of sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of sensor 10. The processor unit may also track changes in the position of a touch or proximity input within the touch-sensitive area(s) of sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of sensor 10 may couple the drive or sense electrodes of sensor 10 to connection pads 16, also disposed on the substrate of sensor 10. As described below, connection pads 16 facilitate coupling of tracks 14 to sensor controller 12. Tracks 14 may extend into or around (e.g. at the edges of) the touch-sensitive area(s) of sensor 10. Particular tracks 14 may provide drive connections for coupling sensor controller 12 to drive electrodes of sensor 10, through which the drive unit of sensor controller 12 may supply drive signals to the drive electrodes. Other tracks 14 may provide sense connections for coupling sensor controller 12 to sense electrodes of sensor 10, through which the sense unit of sensor controller 12 may sense charge at the capacitive nodes of sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, sensor 10 may include one or more ground lines terminating at a ground connector (which may be a connection pad 16) at an edge of the substrate of sensor 10 (similar to tracks 14).

Connection pads 16 may be located along one or more edges of the substrate, outside the touch-sensitive area(s) of sensor 10. As described above, sensor controller 12 may be on an FPC. Connection pads 16 may be made of the same material as tracks 14 and may be bonded to the FPC using an anisotropic conductive film (ACF). Connection 18 may include conductive lines on the FPC coupling sensor controller 12 to connection pads 16, in turn coupling sensor controller 12 to tracks 14 and to the drive or sense electrodes of sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between sensor controller 12 and sensor 10.

Figure 2A:
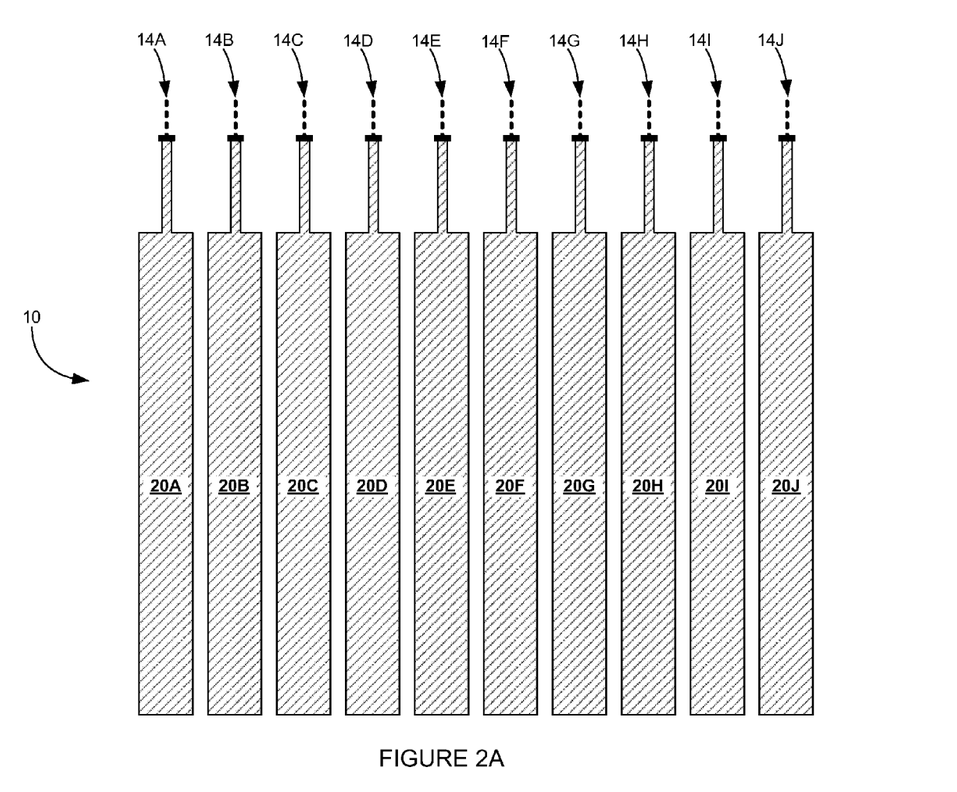
FIGS. 2A-2B illustrate top and cross-sectional views of an example sensor with example electrodes and an example electrode configuration sequence.

FIG. 2A illustrates a top view of an example sensor 10 with example electrodes 20 coupled to example tracks 14 of conductive material. In the example of FIG. 2A, electrodes 20 are substantially rectangular, and each electrode 20 may have a portion that extends to a track 14. In particular embodiments, an electrode 20 may be an area of conductive material forming a shape, such as for example a disc, square, rectangle, thin line, diamond, snowflake, other suitable shape, or any suitable combination of these. In particular embodiments, electrodes 20 may have portions that are interdigitated with each other. In particular embodiments, an electrode 20 may be formed by two or more distinct areas of conductive material that are electrically coupled together. Although this disclosure describes or illustrates particular electrodes 20 having particular shapes this disclosure contemplates any suitable electrodes 20 having any suitable shapes or being formed from any suitable areas of conductive material.

In the example of FIG. 2A, electrodes 20 may have an elongated shape and their longer axis may be oriented along a particular axis, such as for example a vertical or a horizontal axis of sensor 10. Moreover, electrodes 20 may be arranged substantially parallel to each other. In particular embodiments, one or more electrodes 20 may together form a line running horizontally, vertically, or in any suitable orientation, and the one or more electrodes 20 may form a drive line, a sense line, or a ground line. Although this disclosure describes or illustrates particular electrodes 20 having particular orientations relative to particular axes or having particular arrangements relative to each other, this disclosure contemplates any suitable electrodes 20 having any suitable orientation or arrangement. Although this disclosure describes or illustrates particular sensors 10 having a particular number of electrodes 20 in particular arrangements, this disclosure contemplates any suitable sensor 10 having any suitable number of electrodes 20 in any suitable arrangement.

Figure 2B:
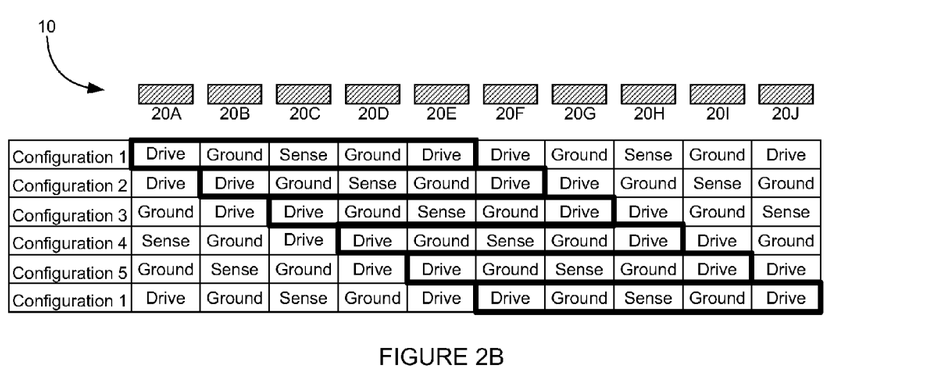

FIG. 2B illustrates a cross-sectional view of example electrodes 20 from FIG. 2A and a table that lists an example configuration sequence for electrodes 20. In particular embodiments, each electrode 20 may be configured as a drive electrode, a sense electrode, or a ground electrode. A drive electrode (or drive line) may include one or more electrodes 20 that are configured as drive electrodes. A sense electrode (or sense line) may include one or more electrodes 20 that are configured as sense electrodes. A ground electrode (or ground line) may include one or more electrodes 20 that are configured as ground electrodes, such as for example, by coupling to an electrical ground. In particular embodiments, electrodes 20 may be configured by controller 12, and a particular electrode configuration may include specifying each electrode 20 as a drive electrode, a sense electrode, or a ground electrode. An electrode configuration sequence may include a list that specifies one or more such electrode configurations. The electrode configuration sequence may represent a series of one or more electrode configurations, and electrodes 20 may be stepped sequentially through each configuration of the electrode configuration sequence. In particular embodiments, each electrode 20 may be configured as a drive, sense, or ground electrode, and as the electrodes are stepped through the electrode configuration sequence, each electrode may have its configuration changed during the operation of sensor 10. In the example of FIG. 2B, as the configuration sequence advances through each configuration from configuration 1 to configuration 5, electrode 20A is configured, respectively, as follows: drive, drive, ground, sense, and ground.

In example configuration 1 illustrated in FIG. 2A, electrodes 20A, 20E, 20F, and 20J may be configured as drive electrodes; electrodes 20C and 20H may be configured as sense electrodes; and electrodes 20B, 20D, 20G, and 20I may be configured as ground electrodes. For a particular configuration, electrodes 20 may form a mutual-capacitance touch sensor having one or more capacitive nodes. As described above, in particular embodiments, a drive and sense electrode may be capacitively coupled to each other across a space between them. In particular embodiments, a group of one or more adjacent drive electrodes and a group of one or more adjacent sense electrodes may be separated by one or more ground electrodes located between the two groups of drive and sense electrodes. As an example and not by way of limitation, in configuration 1, drive electrode 20A and sense electrode 20C are separated by ground electrode 20B. As an example and not by way of limitation, in configuration 1, adjacent drive electrodes 20E and 20F and sense electrode 20H are separated by ground electrode 20G.

For example configuration 1 in FIG. 2B, controller 12 may transmit drive signals to drive electrodes 20A, 20E, 20F, and 20J and receive sensing signals from sense electrodes 20C and 20H to determine a location of an object or whether an object has come within proximity of sensor 10. Then, controller 12 may reconfigure electrodes 20 to configuration 2 in FIG. 2B. With configuration 2, controller 12 may transmit drive signals to drive electrodes 20A, 20B, 20F, and 20G and receive sensing signals from sense electrodes 20D and 20I. In a similar fashion, controller 12 may proceed to configuration 3, configuration 4, and configuration 5, performing a similar measurement at each configuration that includes the transmission and receipt of drive and sense signals, respectively. After configuration 5, the electrodes 20 may return to configuration 1, and the sequence of scanning the electrode configuration across sensor 10 may repeat again. As described above, in particular embodiments, electrodes 20 may be arranged substantially parallel to each other and may be oriented along a same axis, such as for example, a vertical or horizontal axis. In such an arrangement, a drive-and-sense measurement (e.g., the transmission of drive signals to drive electrodes and the receipt of sense signals from sense electrodes) may determine a location or sense a proximity of an object along an axis that is located in a plane of electrodes 20 and is substantially or approximately orthogonal to an axis that electrodes 20 are oriented along. In the example of FIG. 2A, electrodes may be arranged substantially parallel to each other and may be oriented along a vertical axis. With this arrangement, a drive-and-sense measurement may determine a location or sense a proximity of an object along a horizontal axis. By performing a drive-and-sense measurement with electrodes 20 in one particular configuration, the resolution with which an object's position or proximity may be determined may be on the order of the width of the number of electrodes 20 within a repeated pattern of electrodes 20. In the example of FIG. 2B, there are five electrodes 20 within the repeated pattern of electrodes 20 (e.g., drive, ground, sense, ground, drive), and for one particular electrode configuration the resolution with which an object's position or proximity may be determined may be on the order of approximately a width of five electrodes 20. By stepping through a sequence of electrode configurations that may include scanning the electrode configuration pattern across sensor 10 and performing a drive-and-sense measurement at each configuration, as described above, the resolution with which an object's position or proximity may be determined may be improved to on the order of approximately a width of one electrode 20. In the example of FIG. 2B, a drive-and-sense measurement may be performed at each of the five electrode configurations shown in the table, and then the measurement sequence may return to configuration 1 and repeat the sequence of scanned measurements again to repeatedly scan across the horizontal extent of touch screen 10.

The example of FIG. 2A shows electrodes 20 oriented along a vertical axis, and a drive-and-sense measurement may determine a location or sense a proximity of an object along a horizontal axis. In particular embodiments, electrodes 20 may be oriented along a horizontal axis, and a drive-and-sense measurement may determine a location or sense a proximity of an object along a vertical axis. In particular embodiments, sensor 10 may include an array of electrodes oriented along a vertical axis to determine an object's location along a horizontal axis and another array of electrodes oriented along a horizontal axis to determine an object's location along a vertical axis. In such an example embodiment, a location of an object may be determined or an object's proximity may be sensed in two dimensions, along horizontal and vertical axes.

In particular embodiments, sensor 10 may include an array of electrodes whose shape and arrangement is such that electrodes 20 may be configured to determine an object's location along a vertical and a horizontal axis. Although this disclosure describes or illustrates arrays of electrodes 20 having particular shapes, arrangements, or number of electrodes 20 for determining an object's location along one or more particular axes, this disclosure contemplates any suitable electrodes 20 having any suitable shapes, arrangements, or number of electrodes 20 for determining an object's location along any suitable one or more axes.

In the example of FIG. 2B, a configuration of electrodes 20 may be described as having the following arrangement repeated across the extent of sensor 10: drive, drive, ground, sense, ground. This same configuration may be equivalently described as having the following repeated arrangement: drive, ground, sense, ground, drive. In particular embodiments, a configuration of electrodes 20 may include three adjacent drive electrodes and two adjacent ground electrodes, as shown by the following arrangement: drive, drive, drive, ground, ground, sense, ground, ground. In particular embodiments, a configuration of electrodes 20 may include the following arrangement: drive, drive, drive, ground, sense, ground. In particular embodiments, the configuration of electrodes 20 may include any suitable arrangement where each group of one or more adjacent drive electrodes and each group of one or more adjacent sense electrodes may have one or more ground electrodes located between the two groups of drive and sense electrodes. In particular embodiments, the configuration of electrodes 20 may include any suitable arrangement where each group of one or more adjacent sense electrodes may have one or more ground electrodes located adjacent to and on both sides of the group. In particular embodiments, the configuration of electrodes 20 may not follow a particular pattern, may not have a pattern that repeats across sensor 10, or may not exhibit a particular symmetry, such as for example the following arrangement: drive, ground, ground, sense, ground, drive, drive, drive, ground, sense, ground. Although this disclosure describes or illustrates particular electrode configurations, this disclosure contemplates any suitable electrode configuration that includes any suitable arrangement of drive, sense, or ground electrodes.

In the example of FIG. 2B, an example electrode configuration sequence is shown that includes a five-electrode pattern (e.g., drive, ground, sense, ground, drive) repeated across the extent of sensor 10. The bold line in FIG. 2B drawn around this group of five electrodes 20 is a visual aid to indicate the changes in electrode configurations as the electrode pattern is scanned across sensor 10. The electrode configuration sequence steps through five configurations (e.g., configuration 1, configuration 2, configuration 3, configuration 4, and configuration 5) and then returns to configuration 1 where the sequence repeats. In general, an electrode configuration that includes a repeated pattern of n electrodes may have an electrode configuration sequence that includes n configurations before the electrode configuration sequence repeats. And for such an electrode configuration, a scan across sensor 10 may be performed in n discrete steps. In the example of FIG. 2B, the progression from one configuration to the next in the sequence may be viewed as a stepwise advancement of the electrode configuration across sensor 10, where the electrode configuration uniformly shifts to the right by one electrode when switching from one configuration to the next. In configuration 1 of FIG. 2B, electrodes 20A, 20B, 20C, 20D, and 20E are configured as drive, ground, sense, ground, drive, respectively, and electrodes 20F, 20G, 20H, 20I, and 20J repeat the same configuration pattern. In the next configuration (configuration 2) of FIG. 2B, the pattern has uniformly shifted to the right by one electrode so that electrodes 20B, 20C, 20D, 20E, and 20F are now configured as drive, ground, sense, ground, drive, respectively, and electrode 20A is configured as a drive electrode, the next element in the repeating five-electrode pattern. In particular embodiments, the electrode configuration sequence may include any suitable number of configurations of electrodes 20. In particular embodiments, the electrode configuration sequence may include a single, stationary configuration of electrodes 20 that is not scanned across sensor 10. In particular embodiments, the electrode configuration may be shifted horizontally, vertically, in any suitable direction, or any suitable combination of directions as the electrodes progress from one configuration to the next. In particular embodiments, the electrode configuration may be shifted by one, two, or any suitable fixed number of electrodes, or any suitable varying number of electrodes in any suitable direction as the electrodes progress from one configuration to the next. Although this disclosure describes or illustrates particular electrode configurations and particular electrode configuration sequences, this disclosure contemplates any suitable electrode configuration and any suitable electrode configuration sequence.

The example electrodes 20 in FIGS. 2A and 2B may have a single-layer configuration, where electrodes 20 may be disposed on one side of a substrate. Each electrode 20 may lie in a plane and a single layer of electrodes 20 may together lie in a plane. In particular embodiments, sensor 10 may have electrodes 20 in a two-layer (or dual-layer) configuration, where electrodes 20 are disposed on one side each of two substrates or on two sides of a single substrate. In such a two-layer configuration, electrodes 20 may lie in one of two planes, and the planes may be parallel. In particular embodiments, electrodes 20 may have a multi-layer configuration, where electrodes 20 are disposed on one or more sides of one or more substrates. Although this disclosure describes or illustrates particular electrodes 20 configured in one or more particular layers, this disclosure contemplates any suitable electrodes 20 configured in any suitable one or more layers. Reference may be made to one or more electrodes 20 being adjacent to one another, or reference may be made to one or more electrodes 20 being located next to or between one or more other electrodes 20. Such reference may refer to relative position of electrodes 20 along an axis that lies within a plane of electrodes 20. Moreover, such reference to relative position of electrodes may be made as if the electrodes lie in a single plane. In an embodiment where electrodes lie in one or more parallel planes, such reference to relative position of electrodes may be made as if the one or more parallel planes were combined together into a single plane.

Figure 3:
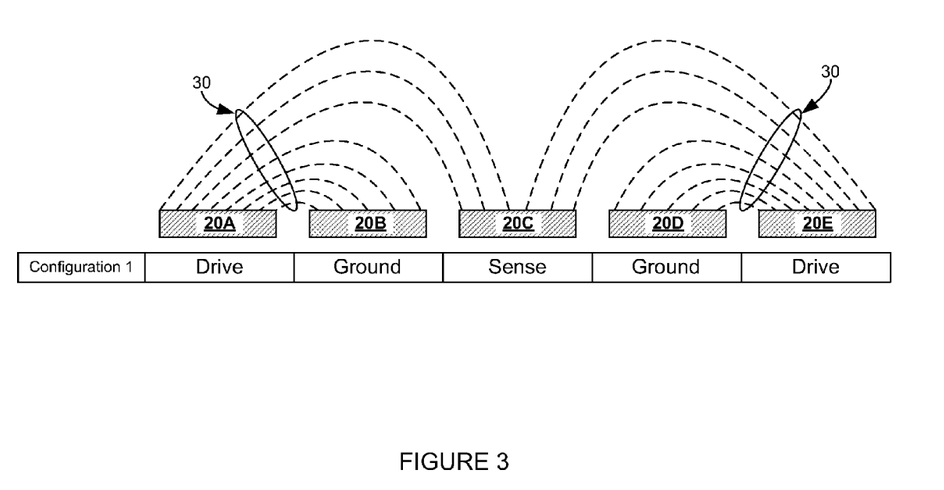
FIG. 3 illustrates a portion of the sensor of FIG. 2B with an example electrode configuration and example electric-field lines.

FIG. 3 illustrates a portion of the cross-section of example electrodes 20 from FIG. 2B and example electric-field lines 30 (or electric field). Electrodes 20 in FIG. 3 are set to configuration 1 with electrodes 20A, 20B, 20C, 20D, and 20E configured as drive, ground, sense, ground, and drive electrodes, respectively. In particular embodiments, a drive signal applied to drive electrodes 20A and 20E may generate an electric field 30, a portion of which may extend from drive electrodes 20A and 20E to sense electrode 20C. Sense electrode 20C may produce a sense signal that is at least in part due to electric field 30 and a capacitance between drive electrodes 20A and 20E and sense electrode 20C. In particular embodiments, an object that comes within proximity of sensor 10 may perturb electric field 30 and may cause a change in a capacitance between drive electrodes 20A and 20E and sense electrode 20C. An electric-field perturbation and an associated capacitance change may cause a change in a sense signal produced by sense electrode 20C, indicating that an object has come within proximity of sensor 10. A sense signal may be measured by a measurement circuit associated with sense electrode 20C.

In FIG. 3, electric field lines 30 include a near-portion and a far-portion, where the far-portion extends farther away from a plane (or planes) in which electrodes 20 are disposed than the near-portion. FIG. 3 illustrates electrodes 20B and 20D configured as ground electrodes with a near-portion of electric field 30 extending from drive electrodes 20A and 20E to ground electrodes 20B and 20D. Ground electrodes 20B and 20D may be located between drive and sense electrodes and may act as a shunt, diverting a near-portion of electric field 30 away from sense electrode 20C. Here, a shunt may refer to a capacitance in parallel with a drive-sense electrode capacitance, and a shunt capacitance may divert a portion of electric field 30 away from one or more sense electrodes toward one or more ground electrodes. In FIG. 3, a shunt capacitance may be a capacitance between drive electrodes 20A and 20E and ground electrodes 20B and 20D. By locating one or more ground electrodes between the drive and sense electrodes, the portion of electric field 30 shunted (or diverted) to ground electrodes 20B and 20D may include a near-portion of electric field 30. Moreover, the portion of electric field 30 that extends from drive electrodes 20A and 20E to sense electrode 20C may include a far-portion of electric field 30. In particular embodiments, shunting a near-portion of electric field 30 away from sense electrode 20C may make sense electrode 20 more sensitive to objects farther away from touch screen 10 than would otherwise be the case without shunting. In particular embodiments, shunting a near-portion of electric field 30 away from sense electrode 20C may remove from sense electrode 20C a significant portion of pedestal (or offset) capacitance associated with a near-portion of electric field. Moreover, shunting may remove a near-portion of electric field 30 from sense electrode 20C, thus reducing the overall electric field 30 (or induced electric charge) at sense electrode 20C. This reduction of electric field (or induced electric charge) at sense electrode 20C may allow an increase in gain of a measurement circuit associated with sense electrode 20C, which may improve the sensitivity of sense electrode 20C to detection of objects that come within its proximity.

In the example of FIGS. 2A and 2B, an electrode configuration may include two adjacent drive electrodes 20 to project electric field 30 above sensor 10 and one ground electrode to reduce a near-portion influence of electric field 30 on sensor electrode. By selecting other electrode configurations having different numbers of drive, sense, or ground electrodes, the shape or structure of electric field 30 may be altered and a far-portion of electric field 30 may be made to extend closer to or farther from sensor 10, depending on the application and the desired proximity sensitivity for sensor 10. In particular embodiments, it may be desired to have a sensor 10 with proximity sensitivity in a range of approximately 5-10 mm from sensor 10. In particular embodiments, it may be desired to have a sensor 10 with proximity sensitivity in a range of approximately 20-30 mm from sensor 10. Selecting a particular electrode configuration with a particular number of adjacent drive, sense, or ground electrodes, may allow for the sensitivity range of a touch sensor to be effectively tuned to a desired range. As an example and not by way of limitation, in particular embodiments, an electrode configuration may be applied to a particular sensor 10 resulting in the ability to sense and track an object located approximately 20 mm above the surface of sensor 10. In this example, the proximity of an object to the surface of touch sensor may be determined when the object is approximately 20 mm or less above the surface of sensor 10. In particular embodiments, electrode configurations may be applied that allow the proximity of an object to be determined when the object is 5-10 mm, 10-20 mm, 20-30 mm, or any suitable distance or range of distances above the surface of sensor 10. As an example and not by way of limitation, an electrode configuration may include three adjacent drive electrodes and two adjacent ground electrodes along with a single sense electrode. As an example and not by way of limitation, an electrode configuration may include three adjacent drive electrodes and one ground electrode along with a single sense electrode. Although this disclosure describes or illustrates particular electrode configurations that may include particular numbers of drive, sense, or ground electrodes, this disclosure contemplates any suitable electrode configuration having any suitable number of drive, sense, or ground electrodes.

Figure 4:
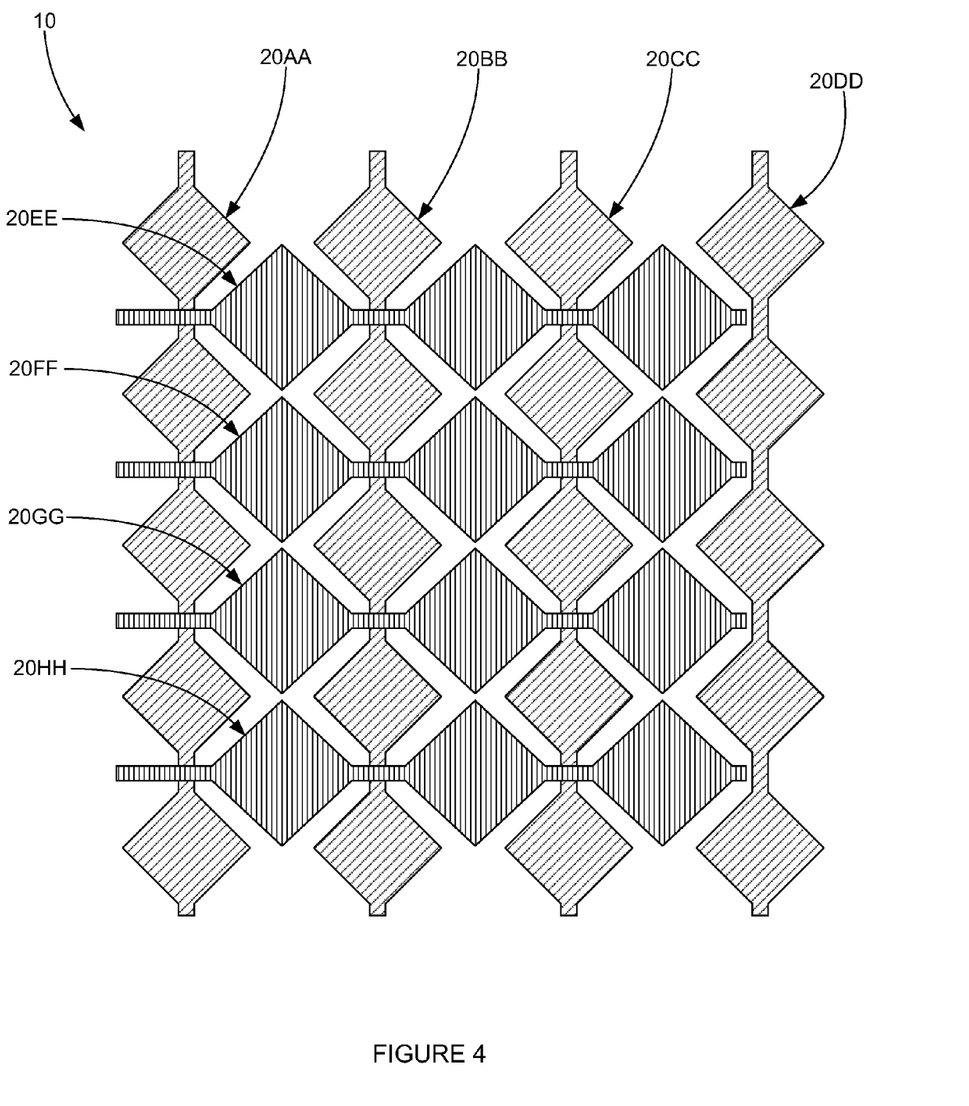
FIG. 4 illustrates another example sensor with other example electrodes.

FIG. 4 illustrates an example sensor 10 with example electrodes 20, where electrodes 20 may be disposed on two layers. Electrodes 20AA, 20BB, 20CC, and 20DD may be disposed on one side of a substrate. Electrodes 20EE, 20FF, 20GG, and 20HH may be disposed on another side of the same substrate or on one side of another substrate. Electrodes 20AA, 20BB, 20CC, and 20DD (e.g., vertical electrodes) may be aligned substantially parallel to each other and oriented along a vertical axis. Each vertical electrode 20AA-DD may be configured as a drive, sense, or ground electrode, and vertical electrodes 20AA-DD may be used to determine an object's position or proximity along a horizontal axis. Electrodes 20EE, 20FF, 20GG, and 20HH (e.g., horizontal electrodes) may be aligned substantially parallel to each other and oriented along a horizontal axis. Each horizontal electrode 20EE-HH may be configured as a drive, sense, or ground electrode, and horizontal electrodes 20EE-HH may be used to determine an object's position or proximity along a vertical axis. Together, electrodes 20 in FIG. 4 may be used to determine, in two dimensions along horizontal and vertical axes, a location of an object or whether an object has come within proximity of sensor 10.

Figure 5:
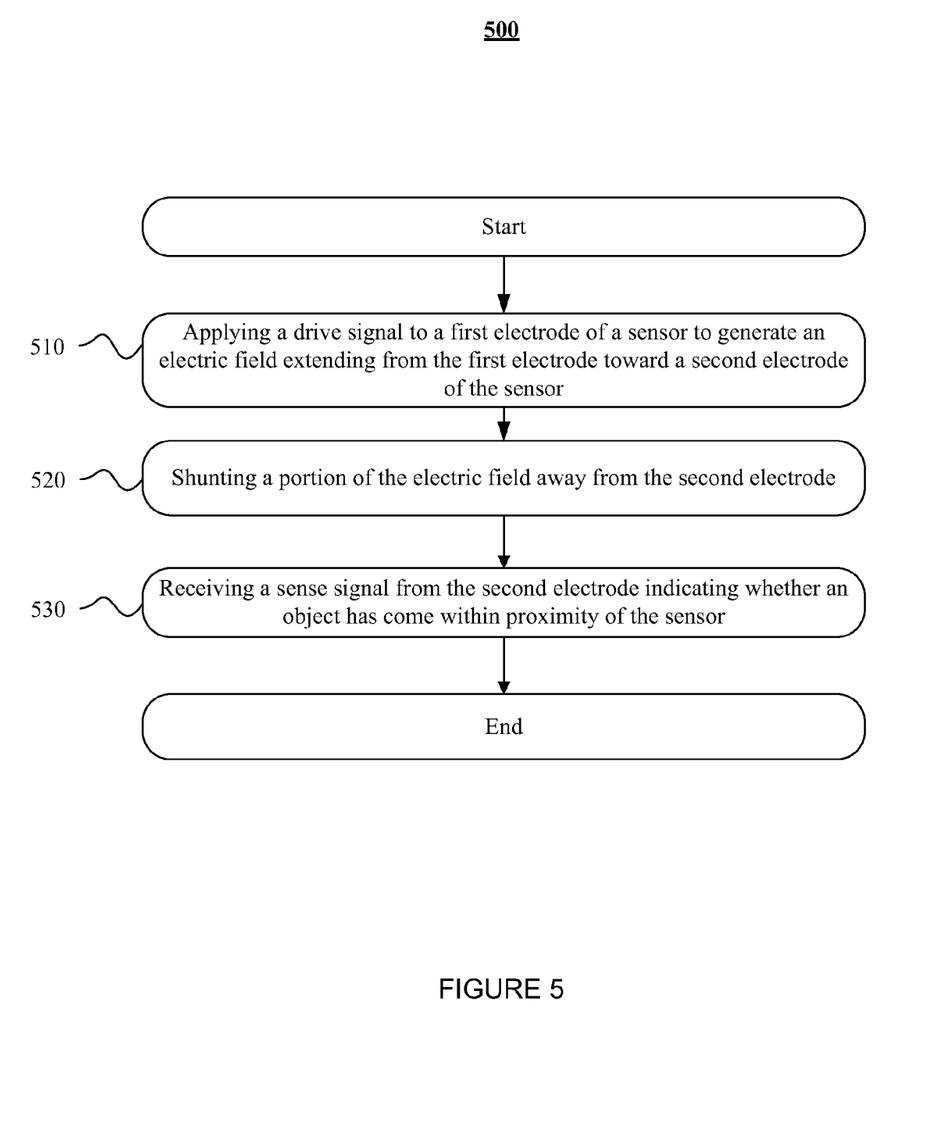
FIG. 5 illustrates an example method for position detection of an object within proximity of a sensor.

FIG. 5 illustrates an example method 500 for position detection of an object within proximity of a sensor. The method may start at step 510, where a drive signal may be applied to a first electrode of a sensor to generate an electric field extending from the first electrode toward a second electrode of the sensor. In particular embodiments, the first electrode may be a drive electrode that may include one or more electrodes, the second electrode may be a sense electrode that may include one or more electrodes, and the sensor may be a touch sensor 10. The electric field extending from the first electrode may include a first portion and a second portion, where the first portion extends farther away from a plane of the first electrode than the second portion. At step 520, a portion of the electric field may be shunted away from the second electrode. In particular embodiments, the second portion of the electric field may be shunted away from the second electrode. In particular embodiments, the second portion of the electric field may be shunted toward a third electrode. In particular embodiments, the third electrode may be a ground electrode that may include one or more electrodes. In particular embodiments, the third electrode may be located between the first and second electrodes. At step 530, a sense signal from the second electrode may be received, where the sense signal indicates whether an object has come within proximity of the sensor, at which point the method may end. If the sense signal from the second electrode indicates that an object has come within proximity of the sensor, then the location of the second electrode in the sensor may indicate the position of the object, as described above.

Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    applying a drive signal to a first electrode of a sensor to generate an electric field extending at least in part from the first electrode toward a second electrode of the sensor, the electric field comprising a first portion and a second portion, the first portion extending farther away from a plane of the first electrode than the second portion;
    shunting the second portion of the electric field away from the second electrode;
    receiving a sense signal from the second electrode produced at least in part by the first portion of the electric field, the sense signal indicating whether an object has come within proximity of the sensor;
    after receiving the sense signal from the second electrode, applying a drive signal to a third electrode of the sensor to generate another electric field extending at least in part from the third electrode toward a fourth electrode of the sensor, the other electric field comprising a third portion and a fourth portion, the third portion extending farther away from a plane of the third electrode than the fourth portion;
    shunting the fourth portion of the electric field away from the fourth electrode; and
    receiving another sense signal from the fourth electrode produced at least in part by the third portion of the electric field, the other sense signal indicating whether the object has come within proximity of the sensor.

2. The method of claim 1, further comprising, if the sense signal from the second electrode indicates that the object has come within proximity of the sensor, then determining a position of the object within proximity of the sensor.

3. The method of claim 2, wherein the position of the object is determined based at least in part on a location of the second electrode in the sensor.

4. The method of claim 1, wherein shunting the second portion of the electric field comprises diverting the second portion of the electric field toward the third electrode by grounding the third electrode.

5. The method of claim 1, wherein shunting the fourth portion of the electric field comprises diverting the fourth portion of the electric field toward the second electrode by grounding the second electrode.

6. The method of claim 1, wherein:
    the plane of the first electrode is the plane of the third electrode;
    the first, second, third, and fourth electrodes are disposed on the plane and extend substantially parallel to each other;
    the third electrode is arranged between the first and second electrodes; and
    the second electrode is arranged between the third and fourth electrodes.

7. The method of claim 1, wherein indicating whether the object has come within proximity of the sensor comprises indicating whether the object has come within approximately 20 mm from a surface of the sensor.

8. The method of claim 1, wherein:
    the sensor is a touch sensor; and
    the object is a finger or stylus.

9. The method of claim 1, wherein:
    the plane of the first electrode is a first plane; and
    the second electrode is disposed on a second plane that is different from but parallel to the first plane.

10. A computer-readable non-transitory storage medium embodying logic that is configured when executed to:
    apply a drive signal to a first electrode of a sensor to generate an electric field extending at least in part from the first electrode toward a second electrode of the sensor, the electric field comprising a first portion and a second portion, the first portion extending farther away from a plane of the first electrode than the second portion;

shunt the second portion of the electric field away from the second electrode;

receive a sense signal from the second electrode produced at least in part by the first portion of the electric field, the sense signal indicating whether an object has come within proximity of the sensor;

after receiving the sense signal from the second electrode, apply a drive signal to a third electrode of the sensor to generate another electric field extending at least in part from the third electrode toward a fourth electrode of the sensor, the other electric field comprising a third portion and a fourth portion, the third portion extending farther away from a plane of the third electrode than the fourth portion;

shunt the fourth portion of the electric field away from the fourth electrode; and receive another sense signal from the fourth electrode produced at least in part by the third portion of the electric field, the other sense signal indicating whether the object has come within proximity of the sensor.

11. The medium of claim 10, wherein the logic is further configured to, if the sense signal from the second electrode indicates that the object has come within proximity of the sensor, then determine a position of the object within proximity of the sensor.

12. The medium of claim 11, wherein the position of the object is determined based at least in part on a location of the second electrode in the sensor.

13. The medium of claim 10, wherein the logic is configured to shunt the second portion of the electric field by diverting the second portion of the electric field toward the third electrode.

14. The medium of claim 13, wherein the logic is configured to divert the second portion of the electric field toward the third electrode by grounding the third electrode.

15. The medium of claim 10, wherein:
the plane of the first electrode is the plane of the third electrode
the first, second, third, and fourth electrodes are disposed on the plane and extend substantially parallel to each other;
the third electrode is arranged between the first and second electrodes; and
the second electrode is arranged between the third and fourth electrodes.

16. The medium of claim 10, wherein the logic is configured to shunt the fourth portion of the electric field by diverting the fourth portion of the electric field toward the second electrode.

17. A device comprising:
a sensor comprising a plurality of electrodes; and
a computer-readable non-transitory storage medium coupled to the sensor and embodying logic that is configured when executed to:
apply a drive signal to a first one of the electrodes to generate an electric field extending at least in part from the first electrode toward a second one of the electrodes, the electric field comprising a first portion and a second portion, the first portion extending farther away from a plane of the first electrode than the second portion;
shunt the second portion of the electric field away from the second electrode;
receive a sense signal from the second electrode produced at least in part by the first portion of the electric field, the sense signal indicating whether an object has come within proximity of the sensor;
after receiving the sense signal from the second electrode, apply a drive signal to a third one of the electrodes to generate another electric field extending at least in part from the third electrode toward a fourth one of the electrodes, the other electric field comprising a third portion and a fourth portion, the third portion extending farther away from a plane of the third electrode than the fourth portion;
shunt the fourth portion of the electric field away from the fourth electrode; and
receive another sense signal from the fourth electrode produced at least in part by the third portion of the electric field, the other sense signal indicating whether object has come within proximity of the sensor.

18. The medium of claim 10, wherein indicating whether the object has come within proximity of the sensor comprises indicating whether the object has come within approximately 20 mm from a surface of the sensor.

19. The medium of claim 10, wherein:
the sensor is a touch sensor; and
the object is a finger or stylus.

20. The medium of claim 10, wherein:
the plane of the first electrode is a first plane; and
the second electrode is disposed on a second plane that is different from but parallel to the first plane.

* * * * *